United States Patent
Osinga et al.

(10) Patent No.: US 8,552,679 B2
(45) Date of Patent: Oct. 8, 2013

(54) PULSE WIDTH CONTROLLED DC-DC CONVERTER HAVING PULSE WIDTH PERIOD CONTROL FOR INFLUENCING POWER CONSUMPTION

(75) Inventors: Anne Jurjen Osinga, Rockanje (NL);
Menno Kardolus, Duivendrecht (NL);
Jan Wanner, Bonaire (AN); Jacobus Harmen Schijffelen, Breda (NL)

(73) Assignee: Intivation Holding B.V., Amsterdam (NL)

( * ) Notice: Subject to any disclaimer, the term of this patent is extended or adjusted under 35 U.S.C. 154(b) by 677 days.

(21) Appl. No.: 12/593,760

(22) PCT Filed: Mar. 30, 2007

(86) PCT No.: PCT/NL2007/050133
§ 371 (c)(1),
(2), (4) Date: Sep. 29, 2009

(87) PCT Pub. No.: WO2008/120970
PCT Pub. Date: Oct. 9, 2008

(65) Prior Publication Data
US 2010/0109600 A1    May 6, 2010

(51) Int. Cl.
*H02J 7/35*    (2006.01)
(52) U.S. Cl.
USPC ........... 320/101; 320/138; 320/139; 320/145; 320/148; 320/155; 323/906

(58) Field of Classification Search
USPC .................................. 320/101, 145
See application file for complete search history.

(56) References Cited

U.S. PATENT DOCUMENTS

| | | |
|---|---|---|
| 5,528,132 A | 6/1996 | Doluca |
| 6,728,117 B2 | 4/2004 | Schemmann et al. |
| 7,088,076 B2 * | 8/2006 | Densham et al. ............. 320/145 |
| 2002/0084767 A1 | 7/2002 | Arai |
| 2003/0117822 A1 | 6/2003 | Stamenic et al. |
| 2005/0146311 A1 | 7/2005 | Kuo et al. |

FOREIGN PATENT DOCUMENTS

WO   03 036782   5/2003

* cited by examiner

*Primary Examiner* — Yalkew Fantu
(74) *Attorney, Agent, or Firm* — Oblon, Spivak, McClelland, Maier & Neustadt, L.L.P.

(57) ABSTRACT

A method is described wherein DC power is converted into battery charging power by means of an inductor carrying a current which is controlled by a power controller during an adjustable part of a pulse width period. The pulse width period is made adjustable in order to influence the power consumption of the controller which consumes a substantial amount of the total power consumed for controlled DC-DC conversion. Several additional features are provided to improve the efficiency and to further reduce the power consumed by both the converter and the power controller, which provides new uses for a variety of products and appliances having solar cells, such as road studs.

14 Claims, 2 Drawing Sheets

PULSE WIDTH CONTROLLED DC-DC CONVERTER HAVING PULSE WIDTH PERIOD CONTROL FOR INFLUENCING POWER CONSUMPTION

The present invention relates to a method wherein DC power is converted into battery charging power by means of an inductor carrying a current which is controlled by a power controller during an adjustable part of a pulse width period.

The present invention also relates to a device for voltage conversion, comprising a DC-DC converter to be coupled to a DC source and provided with an inductor, a power controller coupled to the converter and provided with a pulse width modulator for controlling inductor current during an adjustable part of a pulse width period to charge a battery.

Such a method and device may for example be applied in rechargeable appliances, such as mobile phones, laptops, organisers, garden lighting, road studs and other devices that are fed by one or more solar cells or fuel cells and are equipped with a rechargeable battery or accumulator for powering a load for example a light source such as one or more LED's.

Know devices comprise a DC-DC converter to convert the power provided by the cells into DC power which is suited to distribute power to the battery and/or the load. Generally the device also comprises a power controller coupled to the converter in order to control the DC power output of the converter such that the converter efficiency is as high as possible.

It is an object of the present invention to provide an method and device showing improved reduced power consumption capabilities.

Thereto the method according to the invention is characterised in that the pulse width period is adjustable and influences the power consumption of the controller.

Accordingly the device following the invention is characterised in that the controller comprises means for adjusting the pulse width period, which adjusting means are controllable for influencing power consumption of the controller.

It is an advantage of the method and device according to the present invention that in practise it is important not only to optimise the efficiency of the DC-DC converter, but instead to consider optimising the power consumption of the combined converter and controller. The inventor found that in particular but not exclusively during periods of low power output, the controller consumes a substantial part of the total power used to convert and control DC output power. Control and switching of the inductor current takes place by means of a pulse width modulator (PWM) and such a modulator is normally operated within the boundaries of certain periods during which the PWM control of the inductor current is effected. It is found that power consumption of a power controller converter used to convert DC input power into DC output power can be influenced by influencing these normally bound and fixed PWM periods.

An embodiment of the method according to the invention is characterised in that extension of the pulse width period reduces the power consumption of the controller.

Advantageously a preferred embodiment of the method according to the invention is characterised in that the pulse width period is derived from a clock frequency of the microprocessor included in the power controller. This way the PWM period is advantageously reduced by simply reducing the clock frequency of the power controller, and in turn the clock frequency reduction reduces the power consumption of the microprocessor controlled power controller as such, which provides advantageous combined performance effects.

A further preferred embodiment of the method according to the invention is characterised in that by appropriate reduction of the battery supply voltage of the power controller the power consumption of the controller is even more reduced.

Further advantageous and preferred practical embodiments of the inventive method and device are set out in the other dependent claims.

At present the method and device according to the invention will be elucidated further together with their additional advantages, while reference is being made to the appended drawing, wherein similar components are being referred to by means of the same reference numerals. In the drawing:

FIG. 3 shows a detailed schematic diagram of the device of FIG. 1.

Figure 1:
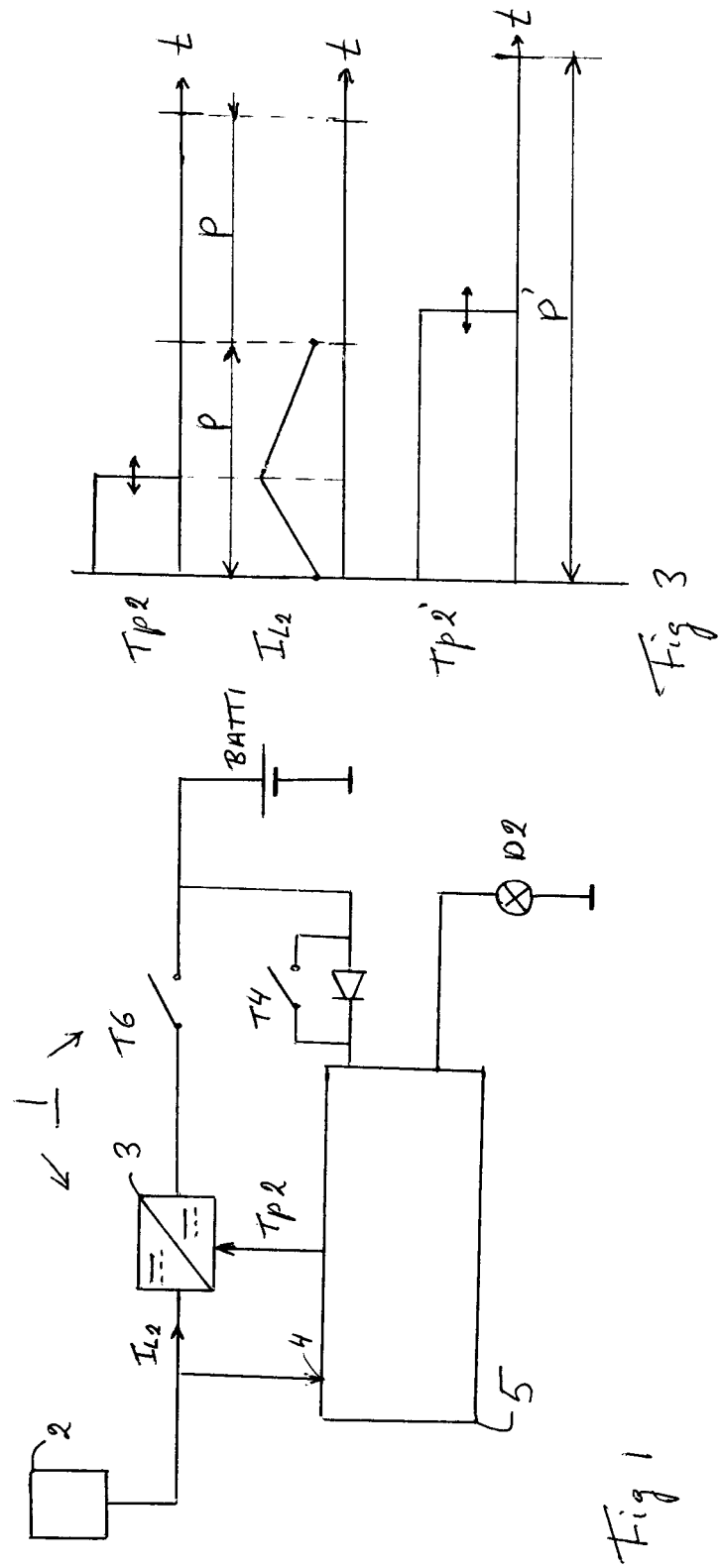
FIG. 1 shows a schematic block diagram of the power conversion device including features of the present invention.
Figure 2:
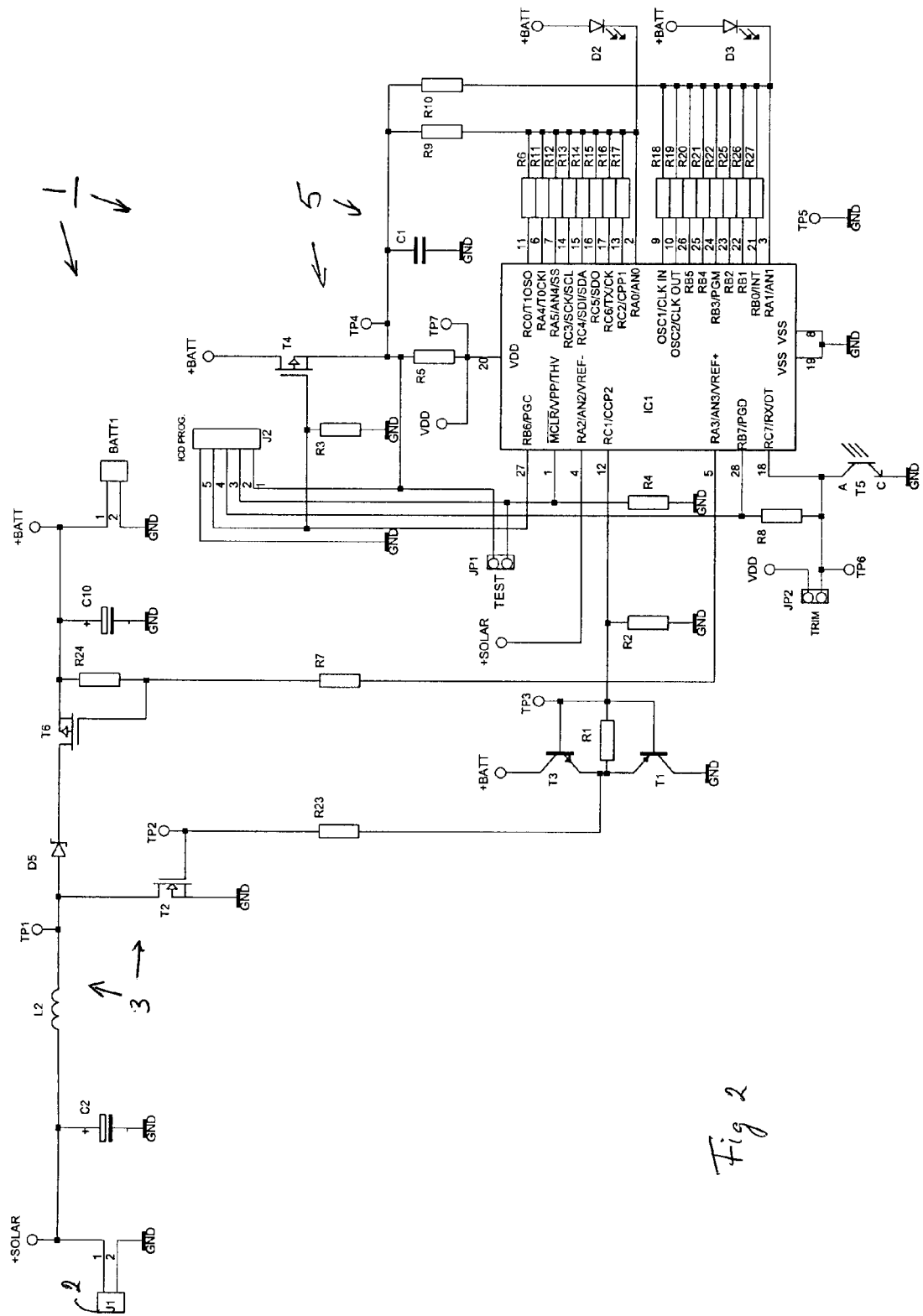
FIG. 2 shows time graphs of pulse width and pulse width period control according to the method of the present invention.

FIG. 1 shows a schematic block diagram and FIG. 2 shows the diagram in further detail of a DC power converting device 1, in particular a voltage up-converter, also called a boost converter, comprising a DC source 2, such as a fuel cell, a so called super capacitor or one or more solar cells for loading one or more batteries BATT1 such as for example a Ni—Cd, a Li-ion polymer or a Li polymer battery. The device 1 further comprises a DC-DC converter, generally indicated with reference numeral 3, which converter 3 is coupled to the DC source 2. The converter 3 is provided with an inductor L2, whose inductor current IL2 is periodically controlled by a power controller 5 of the device 1, which controller 5 is coupled to the converter 3 through control terminal TP2. The terminal TP2 is coupled to the controller 5 through a so called totempole driver comprising controllable semiconductors T3 and T4 which are being controlled by a general purpose microprocessor IC1. The controller 5 comprises a well known pulse width modulator (not shown) for controlling the inductor current IL2 during an adjustable block-sized part indicated TP2 in upper FIG. 3 of consecutive pulse width periods P. In this case the downward edge of the pulse is varied (indicated by arrows) within the period P in accordance with a power point tracking algorithm loaded in the controller 5. Such an algorithm is equipped and fine tuned to optimise the maximum power, rather than the maximum converter efficiency, output by the device 1 as a whole to a load, which is shown as one or two LED's D2 and D3. The LED's may be on or off, or blink either or not in an alternating fashion with some adjustable frequency. Here the LED's are driven by the battery BATT1 which may at the same time be loaded by the device 1 if a sufficient amount of solar energy is provided to the solar cells 2, which together with the batteries then form the actual DC source 2.

FIG. 3 shows the graphs necessary for understanding the operation of the control of the PWM period P. During the indicated block part TP2 in upper FIG. 3 the inductor current IL2 increases and due to the cutting of the current at the downward edge of TP2 inductor coil L2 will provide an induction voltage which through semiconductors D5 and T6 will provide a controlled leveled off battery current for loading the battery. This process will repeat itself during the subsequent periods P. P is normally of a fixed duration and by varying in this mode the downward edge within period P the loading optimally controlled by the mentioned algorithm will keep track with the amount of light falling on solar cell 2. The controller 5 comprises means implemented in the microprocessor controller to adjust during another mode the duration of the extended pulse width period P', which is schematically shown in lower FIG. 3, where the duration of the new P' is approximately twice that of the old P. This lowering of the PWM frequency (1/P') leads to a reduction of the power consumption of the controller 5. Adjusting means make the period P' controllable and consequently influences the power consumption of the controller, which applied in the device 1 saves power which would otherwise get lost during a shorter duration of the PWM period P'. As in some countries like ours sunlight is not as available as one would wish for the purpose of effectively deriving sufficient solar energy, the device 1 now makes it possible to apply solar energy driven appliances on a broader scale, as even with lower solar levels sufficiently mode controlled energy is now becoming available for either charging the batteries 2 and/or for driving the loads D2, D3.

Of course switching of the controller 5 between an active charging mode having shorter P' periods and a reduced power consumption controller mode having longer P' periods is possible. During the former mode the inductor current magnitude IL2 is controlled through normal adjustment of the part TP2 of the pulse width period and during the latter mode the pulse width period P' is extended and now the pulse width part TP2' is adjusted.

If a solar cell appliances an important goal is to withdraw maximum power from the solar cell under all sunlight conditions. Based on knowledge of the solar cell a percentage of for example approximately 80% of the open terminal (no load) voltage of the solar cell is used by the algorithm where above the controller 5 will be busy with power point tracking for at least loading the battery BATT1. If the open terminal voltage falls below said 80% the solar cell current is low and then the controller 5 is being switched from its converter mode to the low power consuming (sleeping) mode during which the pulse width period is extended, but during which the load (LED) current is controlled. Advantageously this maximum power control strategy needs no current measuring means and does not use measured current for current control, which saves costs, volume as well as valuable power. In practise the solar current is however calculated, without being measured, and used with some hysterese between switching points to actually switch between the converter mode and the sleeping mode.

During short moments in time the open terminal voltage is periodically measured in order to effect a temperature correction on the control strategy.

It is effective to apply a method and take the necessary technical measures to derive the corresponding pulse width frequency from a clock frequency provided by a clock or local, possibly internal, generator generally coupled through dividers, as such a generator or oscillator is normally included in the micro-processor IC1 of the power controller 5. As also a reduction of the clock frequency reduces the power consumption of such a controller that reduction now has a surplus effect as it provides an extra power reduction, that is one due to the lowering of the clock frequency and one due to the lowering of the PWM frequency.

FIGS. 1 and 2 show further features for saving electric power. Semiconductor T6 which is also controlled by the controller 5 under circumstances isolates source and battery completely in order to prevent any leakage of current through diode D5, which may be a Schottky diode which is known to have a significant temperature dependent leakage current, which would otherwise empty the battery.

Similarly semiconductor T4 which is controlled by the controller 5 practically isolates the battery from the load D2, D3 or acts as a semiconductor transition which lowers the supply voltage VDD of the microprocessor controller 5 by one transition voltage (approx. 0.6 Volt) and thus effectively reduces power consumption of the controller 5. In that case T4 acts as a switchable controller supply voltage reducing means for at least the controller 5.

Also the power consumed by the load D2, D3 may be influenced and optimised by a controllable parallel arrangement of resistors R6, and R11-R27, which are at the one hand as a voltage divider coupled to the path between the battery and the load and are at the other hand connected to the power controller 5 for adequate inclusion or exclusion of the resistors thereby. High ohmic resistors R9 and R10 prevent IC1 outputs from unwantedly drawing output currents.

The controller 5 comprises generally known decoding means (not shown) coupled to the DC source 2 and pin 4 of the controller 5 for enabling the controller if a predetermined solar light sequence matches a sequence which is stored in an internal memory of the controller 5. After such enabling the controller 5 awakes from its sleep mode to become active in controlling the inductor current IL2.

Pin 18 of the controller 5 is coupled to IR sensitive semiconductor T5 for programming the controller 5 by means of infrared radiation on T5.

The invention claimed is:

1. A method comprising:
   converting DC input power from a DC source having one or more solar cells into battery charging power by means of an inductor carrying a current;
   controlling a current of the inductor by a power controller during an adjustable part of a pulse width period in a first mode, by means of a power point tracking algorithm loaded in the power controller which the algorithm is equipped and fine tuned to optimise the maximum power which is output to a load including one or more batteries, and during a second mode, the pulse width period is an extended pulse width period which is longer than the pulse width period of the first mode, adjustable, and reduces the power consumption of the power controller; and
   switching the power controller from the first mode to the second mode if an open terminal voltage of the one or more solar cells falls below 80% of a predetermined open terminal voltage.

2. The method according to claim 1, further comprising:
   reducing the power consumption of the controller by reducing the battery supply voltage of the power controller.

3. The method according to claim 1 or 2, wherein the pulse width period is derived from a clock frequency of a microprocessor included in the power controller.

4. The method according to claim 3, wherein by reducing the clock frequency, the power consumption of the power controller is reduced further.

5. The method according to claim 4, wherein the clock frequency of the power controller is derived from an internal oscillator.

6. A device for DC input power conversion from one or more solar cells, the device comprising:
   a DC-DC converter to be coupled to a DC source and provided with an inductor; and
   a power controller coupled to the DC-DC converter and provided with a pulse width modulator for controlling inductor current in a first mode during an adjustable part of a pulse width period having a fixed duration to charge one or more batteries;
   the power controller including a microprocessor and means implemented therein to adjust, during a second mode, an extended pulse width period during which power consumption of the controller is reduced, wherein the extended pulse width period is longer than the pulse width period of the first mode, and the controller is switched from the first mode to the second mode upon determination that an open terminal voltage of the one or more solar cells falls below 80% of a predetermined open terminal voltage.

7. The device according to claim 6, the device further comprises:

controller supply voltage reducing means for reducing the power consumption of the controller by reducing the battery supply voltage of the power controller.

8. The device according to claim 7, wherein the controller supply voltage reducing means is formed as semiconductor means coupled in series with a path between the battery and a supply voltage terminal of the controller.

9. The device according to claim 6, wherein the power controller is arranged for switching between the first mode, which is a charging mode, having shorter periods and the second mode, which is a, reduced power consumption controller mode having longer periods.

10. The device according to any one of claim 7, 8 or 9, wherein the device further comprises:

an anti leak means coupled in series to the path between the inductor and the battery.

11. The device according to claim 10, wherein the anti leak means is a controllable main stream path of a controllable semiconductor which is coupled to the controller.

12. The device according to claim 11, wherein the anti leak means includes a one way conducting semiconductor that is a diode or a Schottky diode.

13. The device according to any one of claim 7, 8 or 9, wherein the device further comprises:

a controllable parallel arrangement of resistors connected at one end as a voltage divider to said path and to the battery through a load, and connected at the other end to the power controller.

14. The device according to claim 9, wherein the device is arranged as a road stud including one or more solar cells as a DC source, a rechargeable battery that is a NI-CD or a LI polymer battery, and one or more LED's as a load.

* * * * *